(12) United States Patent
Ganey et al.

(10) Patent No.: US 12,440,312 B2
(45) Date of Patent: Oct. 14, 2025

(54) PALATAL EXPANSION DEVICE

(71) Applicant: West Garden, LLC, Omaha, NE (US)

(72) Inventors: Brent M. Ganey, Omaha, NE (US); Judith A. Scott, Omaha, NE (US)

(73) Assignee: WEST GARDEN, LLC, Omaha, NE (US)

( * ) Notice: Subject to any disclaimer, the term of this patent is extended or adjusted under 35 U.S.C. 154(b) by 344 days.

(21) Appl. No.: 18/095,673

(22) Filed: Jan. 11, 2023

(65) Prior Publication Data
US 2023/0233292 A1  Jul. 27, 2023

Related U.S. Application Data

(60) Provisional application No. 63/302,868, filed on Jan. 25, 2022.

(51) Int. Cl.
*A61C 7/10*   (2006.01)

(52) U.S. Cl.
CPC ....................... *A61C 7/10* (2013.01)

(58) Field of Classification Search
CPC ......... A61C 7/10; A61C 7/00; A61C 17/7258; A61B 17/7216; A61B 17/885; A61B 17/8858; G06M 1/00; G06M 1/064; G06M 1/186; A61M 5/168; A61M 5/1689; A61F 5/56; A61F 5/566; A61F 5/58; A61F 2005/563
See application file for complete search history.

(56) References Cited

U.S. PATENT DOCUMENTS

| | | | |
|---|---|---|---|
| 3,201,040 A | | 8/1965 | Tomlin |
| 3,800,420 A | * | 4/1974 | Ouaknine ............... A61C 7/10 |
| | | | 433/7 |
| 4,323,345 A | * | 4/1982 | Wallshein ............... A61C 7/10 |
| | | | 433/7 |
| 5,281,133 A | | 1/1994 | Farzin-Nia |
| 5,439,377 A | * | 8/1995 | Milanovich .............. A61C 7/10 |
| | | | 433/7 |
| 5,975,894 A | * | 11/1999 | Pozzi ....................... A61C 7/10 |
| | | | 433/7 |
| 6,171,313 B1 | * | 1/2001 | Razdolsky ........... A61B 17/666 |
| | | | 606/86 R |

(Continued)

OTHER PUBLICATIONS

PCT International Search Report dated Apr. 13, 2023; PCT/US2023/010706.

(Continued)

*Primary Examiner* — Heidi M Eide
*Assistant Examiner* — Lina Faraj
(74) *Attorney, Agent, or Firm* — Suiter Swantz IP

(57) ABSTRACT

A palatal expansion device is described. The palatal expansion device is used to expand a palate of a patient. The palatal expansion device includes one or more features which enhance the safety, accuracy, and efficiency of palatal expansion. A direction limiter controls the direction of rotation of a jackscrew. The direction limiter prevents incorrect expansion or compression of the palate. A mechanical turn counter counts the number of turns of the jackscrew. The mechanical turn counter disengages once a preset number of turns is achieved. The preset number of turns may be set by the orthodontist during each visit using a dial.

14 Claims, 12 Drawing Sheets

(56) References Cited

U.S. PATENT DOCUMENTS

| | | | | |
|---|---|---|---|---|
| 6,241,517 | B1* | 6/2001 | Williams | A61C 7/36 |
| | | | | 433/7 |
| 7,331,781 | B1* | 2/2008 | Bandeen | A61C 7/10 |
| | | | | 433/7 |
| 9,615,864 | B2 | 4/2017 | Kuiken | |
| 2003/0207225 | A1* | 11/2003 | Huge | A61C 7/10 |
| | | | | 433/7 |
| 2005/0037313 | A1 | 2/2005 | Huge et al. | |
| 2005/0049616 | A1* | 3/2005 | Rivera | A61B 17/1285 |
| | | | | 606/143 |
| 2007/0218416 | A1* | 9/2007 | Keles | A61C 7/10 |
| | | | | 433/7 |
| 2008/0057458 | A1 | 3/2008 | Bandeen | |
| 2015/0024334 | A1* | 1/2015 | Montalban | A61C 7/10 |
| | | | | 433/7 |
| 2016/0120622 | A1* | 5/2016 | Montalban | A61C 7/10 |
| | | | | 433/7 |
| 2016/0235500 | A1 | 8/2016 | Dolfi et al. | |
| 2017/0340836 | A1 | 11/2017 | Kiilerich | |
| 2023/0329898 | A1* | 10/2023 | Kruger | A61F 5/566 |

OTHER PUBLICATIONS

Conway, Kelly R., "The Design of a Palatal Expansion Appliance", Loyola eCommons, A Thesis Submitted to the Faculty of the Graduate School of Loyola University of Chicago, May 1987, 160 pages.

* cited by examiner

PALATAL EXPANSION DEVICE

CROSS-REFERENCE TO RELATED APPLICATION

The present application claims the benefit of U.S. Provisional Application Ser. No. 63/302,868, filed on Jan. 25, 2022, titled "PALATAL EXPANSION DEVICE", naming Brent M Ganey et al. as inventors, which is incorporated herein by reference in the entirety.

TECHNICAL FIELD

The present invention generally relates to orthodontic devices, and more particularly to orthodontic expander devices.

BACKGROUND

The upper jaw, or maxilla, may include maxillary bones which are fused at an intermaxillary suture. Orthodontic treatments may include expansion of the upper jaw. A circumference of a palate may be expanded by such orthodontic treatment. Widening the circumference of the palate may increase the perimeter of the dental arch to create more space for teeth growth. Palatal expansion may be performed for a number of purposes, including correcting narrow palates, preventing teeth crowding, fixing crossbite, and/or aligning the lower and upper teeth. Palatal expansion devices may be fit over teeth in the upper jaw or be surgically embedded to the palate. The palatal expansion device may then be activated to create a force between the palatal bones. Over time, the two palatal bones move apart and the jaw widens. Orthodontists may leave the appliance in for a few months after the desired expansion is achieved to allow new bone to form. The palate expansion treatment may take between 3 to 6 months.

Palatal expansion devices are prone to user error. The user error may under or overexpand the palatal expansion devices. The under or overexpanding may contribute to pain and increased treatment time. Therefore, it would be advantageous to provide one or more of a device, system, or method that cures the shortcomings described above.

SUMMARY

A palatal expansion device is described, in accordance with one or more embodiments of the present disclosure. In some embodiments, the palatal expansion device includes an expansion unit. In some embodiments, the expansion unit includes a jackscrew. In some embodiments, the jackscrew includes a first external threaded portion and a second external threaded portion. In some embodiments, the first external threaded portion includes a first handedness and the second external threaded portion includes a second handedness which is opposite to the first handedness. In some embodiments, the jackscrew defines a plurality of holes between the first external threaded portion and the second external threaded portion. In some embodiments, the plurality of holes are revolved around an axis of the jackscrew. In some embodiments, the expansion unit includes a first body member mated to the first external threaded portion. In some embodiments, the expansion unit includes a second body member mated to the second external threaded portion. In some embodiments, turning the jackscrew causes the first body member to translate relative to the second body member. In some embodiments, the expansion unit includes a mechanical turn counter. In some embodiments, the mechanical turn counter is one of housed by the first body member and coupled to the first external threaded portion or housed by the second body member and coupled to the second external threaded portion. In some embodiments, the mechanical turn counter is configured to count a number of turns of the jackscrew.

A palatal expansion device is described, in accordance with one or more embodiments of the present disclosure. In some embodiments, the palatal expansion device includes an expansion unit. In some embodiments, the expansion unit includes a jackscrew. In some embodiments, the jackscrew includes a first external threaded portion and a second external threaded portion. In some embodiments, the first external threaded portion includes a first handedness and the second external threaded portion includes a second handedness which is opposite to the first handedness. In some embodiments, the jackscrew defines a plurality of holes between the first external threaded portion and the second external threaded portion. In some embodiments, the plurality of holes are revolved around an axis of the jackscrew. In some embodiments, the expansion unit includes a first body member mated to the first external threaded portion. In some embodiments, the expansion unit includes a second body member mated to the second external threaded portion. In some embodiments, turning the jackscrew causes the first body member to translate relative to the second body member. In some embodiments, the expansion unit includes a direction limiter configured to prevent compression of the first body member relative to the second body member. In some embodiments, the direction limiter is one of housed by the first body member and coupled to the first external threaded portion or housed by the second body member and coupled to the second external threaded portion.

An expansion unit is described, in accordance with one or more embodiments of the present disclosure. In some embodiments, the expansion unit includes a jackscrew. In some embodiments, the jackscrew includes a first external threaded portion and a second external threaded portion. In some embodiments, the first external threaded portion includes a first handedness and the second external threaded portion includes a second handedness which is opposite to the first handedness. In some embodiments, the jackscrew defines a plurality of holes between the first external threaded portion and the second external threaded portion. In some embodiments, the plurality of holes are revolved around an axis of the jackscrew. In some embodiments, the expansion unit includes a first body member mated to the first external threaded portion. In some embodiments, the expansion unit includes a second body member mated to the second external threaded portion. In some embodiments, turning the jackscrew causes the first body member to translate relative to the second body member. In some embodiments, the expansion unit includes at least one of a mechanical turn counter or a direction limiter. In some embodiments, the direction limiter is configured to prevent compression of the first body member relative to the second body member. In some embodiments, the direction limiter is housed by the first body member and coupled to the first external threaded portion. In some embodiments, the mechanical turn counter is housed by the second body member and coupled to the second external threaded portion. In some embodiments, the mechanical turn counter is configured to count a number of turns of the jackscrew.

BRIEF DESCRIPTION OF THE DRAWINGS

Implementations of the inventive concepts disclosed herein may be better understood when consideration is given to the following detailed description thereof. Such description makes reference to the included drawings, which are not necessarily to scale, and in which some features may be exaggerated and some features may be omitted or may be represented schematically in the interest of clarity. Like reference numerals in the drawings may represent and refer to the same or similar element, feature, or function. In the drawings:

FIG. 1I illustrates a top view of a palatal expansion device including an expansion unit with a direction limiter in a compression setting and with body members which are partially compressed, in accordance with one or more embodiments of the present disclosure.

DETAILED DESCRIPTION OF THE INVENTION

Figure 1A:
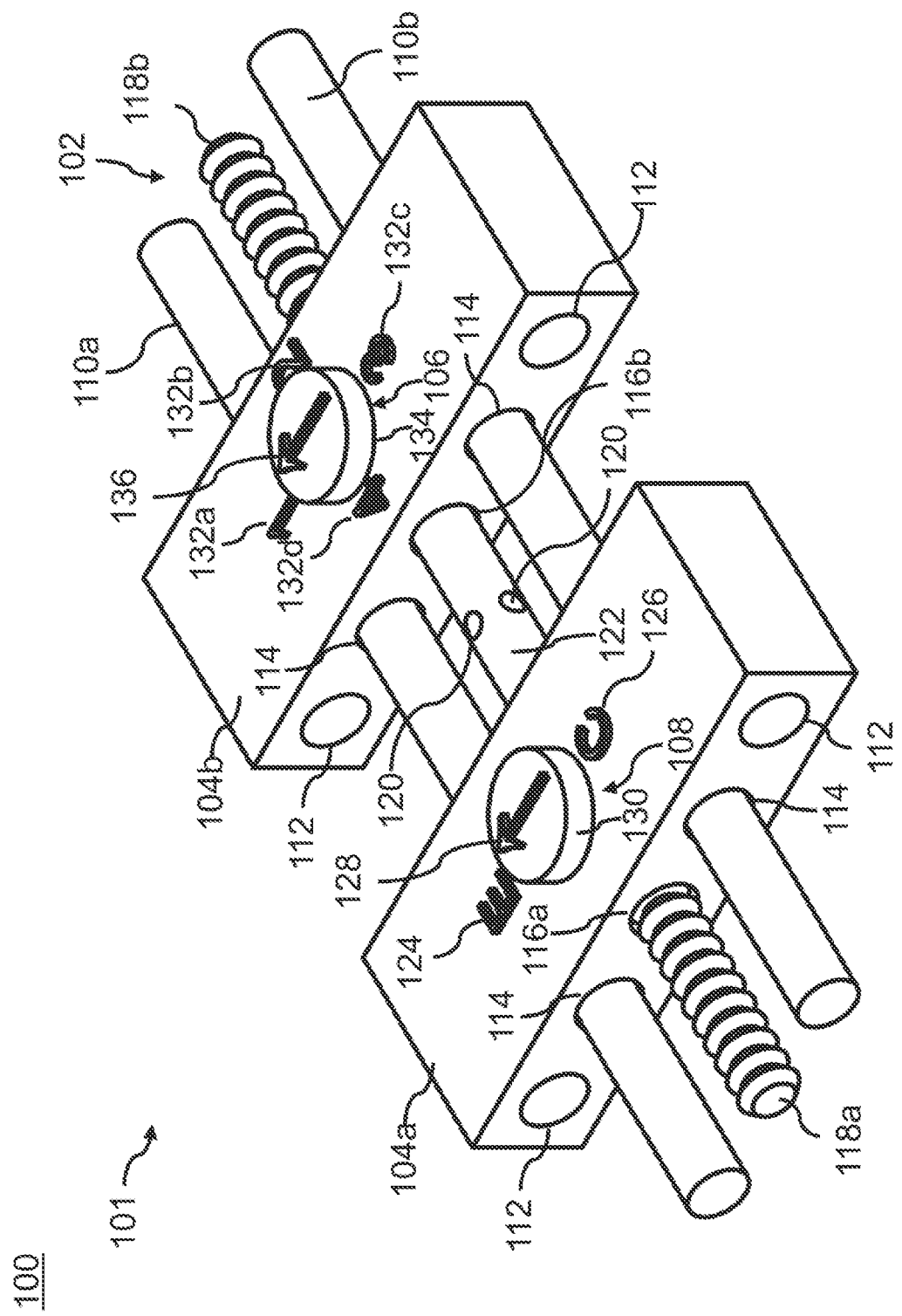
FIG. 1A illustrates a perspective view of a palatal expansion device including an expansion unit with a mechanical turn counter and a direction limiter, in accordance with one or more embodiments of the present disclosure.

The present disclosure has been particularly shown and described with respect to certain embodiments and specific features thereof. The embodiments set forth herein are taken to be illustrative rather than limiting. It should be readily apparent to those of ordinary skill in the art that various changes and modifications in form and detail may be made without departing from the spirit and scope of the disclosure. Reference will now be made in detail to the subject matter disclosed, which is illustrated in the accompanying drawings.

Broadly embodiments of the inventive concepts disclosed herein are directed to a palatal expansion device. The palatal expansion device may include a number of concepts. Embodiments of the present disclosure are directed to a palatal expansion device including a direction limiter. The direction limiter may prohibit "wrong" turns. For example, the palatal expansion device may include an operable direction (e.g., expansion or compression) which may be configurable. Embodiments of the present disclosure are also directed to the palatal expansion device including a mechanical turn counter. The mechanical turn counter may track or measure the number of times the palatal expansion device is turned. The mechanical turn counter may prevent expansion or compression once the palatal expansion device is turned a specified number of turns. The specific number of turns may be configurable, thereby allowing for the number of expansions of the palatal expansion device to be tailored according to a given orthodontic plan. It is further contemplated that the palatal expansion device may both control the direction and the number of turns. In this regard, an orthodontist, assistant, patient, or other operator may be prevented from controlling the direction and/or number of turns without first appropriately configuring the settings of the palatal expansion device.

An orthodontic expander including interval markings is provided in U.S. Pat. No. 7,331,781, titled "Orthodontic Expander for Increasing Maxillary Transverse Dimension and Method," filed on Apr. 28, 2005, which is incorporated herein by reference in the entirety.

FIGS. 1A-1I depict a palatal expansion device 100, in accordance with one or more embodiments of the present disclosure. In embodiments, the palatal expansion device 100 includes an expansion unit 101. The expansion unit 101 may be coupled to a palate of a patient (e.g., coupled by orthodontic bands 202, coupled by implanted screws, etc.). The expansion unit 101 may then be expanded to expand the palate of the patient. The expansion unit 101 may include one or more components, such as, but not limited to, a jackscrew 102, body members 104, mechanical turn counters 106, direction limiters 108, stabilizing rods 110, and the like.

In embodiments, the jackscrew 102 may include external threaded portions 118 (e.g., external threaded portion 118a, external threaded portion 118b). The external threaded portions 118 may also be referred to as a male thread. The external threaded portions 118 may be disposed on each end of the jackscrew 102.

In embodiments, the jackscrew 102 may define holes 120. The holes 120 may be defined by an interior surface of the jackscrew 102. The holes 120 may be disposed between the external threaded portion 118a and the external threaded portion 118b. For example, the holes 120 are depicted as being defined by an unthreaded portion 122 of the jackscrew 102. The unthreaded portion may be disposed between the external threaded portion 118a and the external threaded portion 118b in the center of the jackscrew 102, although this is not intended to be limiting. It is further contemplated that the external threaded portion 118a and the external threaded portion 118b may extend up to the holes 120, such that the jackscrew 102 may not include the unthreaded portion 122 between the external threaded portion 118a and the external threaded portion 118b. The holes 120 may then be defined by the external threaded portion 118a and the external threaded portion 118b.

The holes 120 may be revolved around an axis of the jackscrew 102. The axis of the jackscrew 102 may refer to the central axis of the jackscrew 102. Revolved may refer to a pattern of the holes 120 around the axis. The pattern may include a polar pattern of the holes 120 with an equal angle between adjacent holes. The jackscrew 102 may define any number of the holes 120, such as, but not limited to, three holes, four holes, five holes, six holes, or more. For example, the jackscrew may include four of the holes 120 which are each spaced at 90-degrees relative to one another. By way of another example, the jackscrew 102 may include six of the holes 120 each spaced at 60-degrees relative to one another. The distance between the holes 120 may be based on the diameter of the jackscrew 102 and the number of the holes 120.

The term turn is not intended to be limited to a 360-degree rotation of the jackscrew 102. Rather, a turn may mean a partial rotation of the jackscrew 102. The turn may be based on the angle between the holes 120. For example, a turn may refer to a 120-degree rotation for a three-hole configuration, a 90-degree rotation for a four-hole configuration, a 72-degree rotation for a five-hole configuration, a 60-degree rotation for a six-hole configuration, and the like.

In embodiments, a number of turns-per-revolution of the jackscrew 102 is based on the holes 120. For example, the turns-per-revolution of the jackscrew 102 may be equal to the number of the holes 120. In this regard, rotation between each of the holes 120 may be considered one turn of the jackscrew 102. For example, the jackscrew 102 may include three turns-per-revolution for the three-hole configuration, four turns-per-revolution for the four-hole configuration, five turns-per-revolution for the five-hole configuration, six turns-per-revolution for the six-hole configuration, or more.

The holes 120 may be any type of hole, such as but not limited to, a blind-hole, a through-hole, and the like. In embodiments, the holes 120 are blind-holes. Blind-holes may refer to a hole which is not through the jackscrew 102. In embodiments, the holes 120 are through-holes. The holes 120 may be through-holes where the jackscrew 102 defines an even number of the holes 120. The through-holes may each be considered to define two of the holes 120. For example, a four-hole configuration may include two of the through holes which are spaced at 90-degrees relative to one another. The jackscrew 102 may then be turned four times by the two through holes. By way of another example, a six-hole configuration may include three of the through holes which are spaced at 60-degrees relative to one another. The jackscrew 102 may then be turned six times by the three through holes.

In embodiments, the holes 120 are configured to receive and be turned by a key-wrench (not depicted). The holes 120 may include an inner diameter by which the holes are configured to receive the key-wrench. The key-wrench may refer to an expander key with a small metal tip. The tip may be inserted into one of the holes 120. The key-wrench may then be rotated, causing the jackscrew 102 to rotate by a lever action on the surface of the jackscrew 102 which defines the holes 120.

In embodiments, rotation of the jackscrew 102 may induce linear translation of the body members 104 (e.g., body member 104a, body member 104b). The linear translation may include expansion and/or compression of the body members 104. Expansion may refer to translating the body member 104a and the body member 104b away from each other. Compression may refer to translating the body member 104a and the body member 104b towards each other. For example, the jackscrew 102 may be rotated in a first direction (e.g., clockwise, anti-clockwise). The rotation may expand the body member 104a and the body member 104b. By way of another example, the jackscrew 102 may be rotated in a second direction of rotation (e.g., opposite to the first direction of rotation). The rotation may compress the body member 104a and the body member 104b.

In embodiments, the body members 104 may include an internal threaded portion 116. The internal threaded portion 116 may also be referred to as a female thread. The internal threaded portion 116 may receive and mate with the external threaded portion 118. Mating may refer to flanks of internal threads interfacing with flanks of external threads. The mating between the external threaded portion 118 and the internal threaded portion 116 may convert rotational motion from the jackscrew 102 into linear translation in the body members 104. For example, the body member 104a may include an internal threaded portion 116a. The internal threaded portion 116a may receive the external threaded portion 118a. By way of another example, the body member 104b may include an internal threaded portion 116b. The internal threaded portion 116b may receive the external threaded portion 118b.

The internal threaded portions 116 and the external threaded portions 118 may each included one or more properties, such as, but not limited to, a lead, a pitch, a major diameter, a minor diameter, a thread angle, a handedness, thread profile (e.g., square, rectangular, trapezoidal, etc.), thread length, and the like.

In embodiments, the external threaded portion 118 and the internal threaded portion 116 may include a matching handedness. Handedness may refer to a direction in which a thread warps around a shaft. Handedness may include right-handed and left-handed. In embodiments, the jackscrew 102 may be considered a right-hand and left-hand threaded jackscrew. The right-hand and left-hand threaded jackscrew may also be referred to as a doubled ended jackscrew. For example, the external threaded portion 118a and the internal threaded portion 116a may include a first handedness (e.g., right-handed, left-handed). By way of another example, the external threaded portion 118b and the internal threaded portion 116b may include a second handedness (e.g., opposite to the first handedness). The opposite handedness between the external threaded portions 118 may cause the rotation of the jackscrew 102 to translate both of the body members 104 at the same time and in opposing directions (e.g., for expansion or compression). The jackscrew 102 may thus operate on the principles of a turnbuckle.

In embodiments, each turn of the jackscrew 102 may cause the body members 104 to expand by a set distance. The set distance may be based, among other factors, on the pitch of the threaded portions (e.g., external threaded portions 118 and internal threaded portions 116), the number of the holes 120, the distance between the holes 120, and the like. Expansion of the body members 104 by the set distance may indicate the amount of expansion of the palatal expansion device 100. The palatal expansion device may then be expanded at a desired rate. For example, the palatal expansion device may be expanded at a rate between 0.2 mm per week and 0.5 mm per day, although this is not intended to be limiting.

In embodiments, the thread length of the internal threaded portions 116 and the external threaded portions 118 may define a maximum length by which the expansion unit 101 may expand. For example, the expansion unit 101 may be configured to expand up to 6 mm, up to 8 mm, up to 10 mm, or more.

In embodiments, the expansion unit 101 is configured to couple with and expand a palate of a patient. The expansion unit 101 may be configured to couple with the palate by one or more orthodontic bands 202, bonded expanders, embedded implants, and the like, as will be described further herein. In embodiments, the body members 104 may couple with one or more components of the palatal expansion device 100 for coupling with the palate of the patient. The components may include, but are not limited to, metallic bands coupled to one or more orthodontics bands 202, bonded expanders, embedded implants, and the like. For example, the body members 104 may receive one or more metallic bands coupled between the body member 104 and the orthodontic bands 202. The orthodontic bands may then be coupled to a molar of the patient. By way of another example, the body members 104 may receive one or more screws which are surgically embedded in the palate of the patient.

In embodiments, the body members 104 may include cylindrical bores 112. The cylindrical bores 112 may receive the components for coupling with the palate of the patient (e.g., the orthodontic bands, embedded implants, etc.). The cylindrical bores 112 may include any type of holes, such as, but not limited to, blind holes, through holes, and the like. In embodiments, the cylindrical bores 112 are blind holes. In embodiments, the cylindrical bores 112 are through holes. The components may be coupled to the cylindrical bores 112 by a weld, an adhesive, a press-fit, or another type of coupling.

The palatal expansion device 100 may then be coupled to a palate of a patient during treatment. The patient may insert the key-wrench and turn the jackscrew 102 at home. The turning of the jackscrew 102 may cause the body members to expand or translate relative to one another. The expansion of the body members 104 may cause expansion in the palatal bones of the upper jaw.

In embodiments, the jackscrew 102 is turned by one or more turns at a prescribed interval. The prescribed interval may include multiple times per day, daily, multiple times per week, weekly, biweekly, and the like. Thus, the palatal bones of the upper jaw may move to a desired position over the course of several weeks or months, until the desired bone positioning and structure has been achieved. Advantageously, the patient may expand the palatal expansion device 100 at the prescribed interval without having to visit the orthodontist for each turn of the jackscrew 102.

Rotation of the jackscrew 102 may induce torsion in the body members 104 and the components coupling the palatal expansion device 100 to the patient. In embodiments, the expansion unit 101 may include one or more stabilizing rods 110. The stabilizing rods 110 may reduce or compensate for the torsion within the palatal expansion device 100 induced by turning or rotating the jackscrew 102. The stabilizing rods may reduce a likelihood of failure of the coupling to the palate of the patient by compensating for the torsion. The stabilizing rods 110 may pass through both of the body members 104. The first body member 104a and the second body member 104b may be configured to translate along the stabilizing rods 110. Translating along the stabilizing rods 110 may refer to motion relative to the stabilizing rods. In this regard, the stabilizing rod 110 may constrain the first body member 104a to axial translation (e.g., for expansion and compression) relative to the second body member 104b. The expansion unit 101 may include one or more of the stabilizing rods 110. As depicted, the expansion unit 101 includes a first stabilizing rod 110a and a second stabilizing rod 110b. The jackscrew 102 may be disposed between the first stabilizing rod 110a and the second stabilizing rod 110b.

In embodiments, the body members 104 may define one or more cylindrical bores 114. The cylindrical bores 114 may receive the stabilizing rods 110. The stabilizing rods 110 may be disposed in the cylindrical bore 114 in both the first body member 104a and the second body member 104b. The body members 104 may each include a number of the cylindrical bores 114 based on the number of the stabilizing rods 110. As depicted, the body member 104a and the body member 104b each include two of the cylindrical bores 114, although this is not intended to be limiting.

Although the expansion unit 101 is described as including the stabilizing rods 110 and the cylindrical bores 114 defined by the body members 104, this is not intended as a limitation of the present disclosure. It is further contemplated that the expansion unit 101 may not include any of the stabilizing rods 110. The expansion unit 101 may function without including the stabilizing rods 110 by increasing the coupling strength between the palatal expansion device 100 and the palate. The increased coupling strength may then accommodate for the torsion induced by the jackscrew 102.

As described previously, the body members 104 may define one or more cylindrical bores (e.g., cylindrical bores 112, cylindrical bores 114), internal threaded portions 116, and the like. The cylindrical bores may refer to unthreaded through holes (e.g., cylindrical bores 112, cylindrical bores 114). The internal threaded portions 116 may refer to threaded through holes. The body members 104 may define the cylindrical bores, the internal threaded portions 116, and the like by one or more interior surfaces of the body members 104.

In embodiments, the body members 104 may be compressed and/or expanded. Compression of the body members 104 may prevent palatal expansion of the patient during operation of the palatal expansion device 100. The compression may waste days or weeks of treatment, undesirably increasing the duration of treatment in which the palatal expansion device 100 is coupled to the palate. In embodiments, the palatal expansion device 100 may include a direction indicator 128. The direction indicator 128 may visually indicate which direction to rotate the jackscrew 102 for expanding the body members 104. The direction indicator 128 may include an arrow or a similar indicator. The direction indicator 128 may be advantageous to assist the patient in rotating the jackscrew 102 in the correct direction. However, the patient may be unable to visually see the direction indicator 128 when the palatal expansion device 100 is coupled to the palate of the patient. The patient may then require assistance from a third party to see the direction indicator 128.

In embodiments, the expansion unit 101 includes the direction limiter 108. The direction limiter 108 may control the direction in which the jackscrew 102 may be turned. Controlling the direction may refer to allowing the jackscrew 102 to rotate in a first direction (e.g., clockwise, anti-clockwise) and preventing the jackscrew 102 from rotating in the direction opposite to the first direction. For example, the direction limiter 108 may allow the jackscrew 102 to rotate in an expansion direction and prevent the jackscrew 102 from rotating in a compression direction. Preventing the jackscrew 102 from rotating in the compression direction may prevent the expansion unit 101 from compressing the body members 104. In this regard, the palatal expansion device 100 may be prevented from inadvertently compressing. The direction limiter 108 may then prevent an incorrection compression of the oral palate by the palatal expansion device 100.

The ability to control the direction in which the jackscrew 102 is turned may ensure proper usage of the palatal expansion device 100. The direction limiter 108 may stop the patient from turning in the compression direction. Additionally, the direction limiter 108 may prevent inadvertent or partial wrong turns of the jackscrew 102 when the key-wrench is coupled or uncoupled from the holes 120 of the jackscrew 102.

In embodiments, the direction limiter 108 is configurable between one or more settings. The settings may include an expansion setting 124 and a compression setting 126. The expansion setting 124 may allow the jackscrew 102 to rotate in an expansion direction and prevent the jackscrew 102 from rotating in a compression direction. The direction limiter 108 may permit expansion and prevent compression of the body member 104a relative to the body member 104b in the expansion setting 124. The compression setting 126 may allow the jackscrew 102 to rotate in the compression direction and prevent the jackscrew 102 from rotating in the expansion direction. The direction limiter 108 may prevent expansion and permit compression of the body member 104a relative to the body member 104b in the compression setting 126.

The direction limiter 108 may include a dial 130. The dial 130 may rotate between the expansion setting 124 and the compression setting 126. The setting for the direction limiter 108 may be configured based on the rotation of the dial 130. The dial 130 may also include the direction indicator 128 for indicating the current setting of the direction limiter 108.

In embodiments, the jackscrew 102 may be rotated for a number of turns corresponding to a desired amount of expansion. Losing track of the number of turns may cause incorrect amount of expansion. The incorrect amount of expansion may cause patient pain due to overexpansion or cause an inadequate amount of expansion due to under-expansion.

In embodiments, the expansion unit 101 includes the mechanical turn counter 106. The mechanical turn counter 106 may count a number of turns of a jackscrew 102. In embodiments, the mechanical turn counter 106 may be a rotary counter which mechanically counts the number of rotations. The mechanical turn counter 106 may be coupled to the external threaded portion 118. The mechanical turn counter 106 may then count the number of turns of the jackscrew 102 by the coupling to the external threaded portion 118.

The ability to count the number of turns of the jackscrew 102 may be advantageous to ensure proper usage of the palatal expansion device 100. For example, an orthodontist may use the mechanical turn counter 106 to visually determine the number of turns in which the jackscrew 102 has been turned. The orthodontist may then compare the number of turns with a prescribed number which the patient was supposed to turn the jackscrew 102. Advantageously, the orthodontist may use the number of turns to ensure compliance with the prescribed treatment schedule without having to rely on the patient to keep count of the turns. Thus, the mechanical turn counter may improve the accuracy of the palatal expansion treatment.

In embodiments, the mechanical turn counter 106 may visually indicate one or more turn settings 132. Each of the turns settings 132 may also be referred to as a click. The turn settings 132 may generally include any number of turns as desired. As depicted, the turn settings 132 may include a first turn setting 132a, a second turn setting 132b, a third turn setting 132c, and a fourth turn setting 132d, although this is not intended to be limiting. It is contemplated that the mechanical turn counter 106 may include fewer than four or greater than four of the turn settings 132.

The mechanical turn counter 106 may also include one or more tick-marks (not depicted) between the turn settings 132. The tick-marks may indicate the specific number of turns of the jackscrew 102. The tick-marks may be disposed on the mechanical turn counter 106 between the turn settings 132. The tick-marks may be similar to the marks on an analog clock. For example, the mechanical turn counter 106 may include twelve of the tick-marks between each of the turn settings 132. In the example described with four of the turn settings 132 and twelve tick-marks between turns settings 132, the mechanical turn counter 106 would be configured to count thirty-six turns of the jackscrew 102 between the first turn setting 132a and the fourth turn setting 132d, although this is not intended to be limiting.

The mechanical turn counter 106 may include a dial 134. The dial 134 may rotate between the turn settings 132. The dial 130 may also include a direction indicator 136. The direction indicator 136 may indicate the current setting of the mechanical turn counter. The direction indicator 136 may include an arrow or a similar symbol. The current position of the dial 130 relative to the turn settings 132 may indicate the number of turns of the jackscrew 102. The dial 134 may automatically rotate between the turn settings 132 as the jackscrew 102 is turned.

Too many turns or rotations of the jackscrew 102 can cause over expansion of the expansion unit 101 and similarly overexpansion of the palate. The overexpansion of the palate is undesirable and may cause a number of negative side effects to the patient.

In embodiments, the mechanical turn counter 106 may prevent the jackscrew 102 from turning once a set number of turns is achieved. The mechanical turn counter 106 may be automatically disengaged upon reaching the set number of turns. The disengagement of the mechanical turn counter 106 may prevent further rotation of the jackscrew 102. The mechanical turn counter 106 may then prevent overexpansion of the palate due to overturning the jackscrew 102. For example, the mechanical turn counter 106 may automatically disengage upon reaching the turn setting 132a, although this is not intended to be limiting.

In embodiments, the set number of turns of the mechanical turn counter 106 may be adjustable. The dial 134 may be configured to rotate for adjusting the set number of turns. The set number of turns may include any number of turns in a specific direction (e.g., expansion). The orthodontist may determine the set number of turns based on an established orthodontic plan. The dial 134 may then be rotated to adjust the set number of turns. For example, the dial 134 may be rotated to one of the turn settings 132 and/or to a tick-mark between the turn settings 132.

In embodiments, the expansion unit 101 may include the mechanical turn counter 106 and/or the direction limiter 108. It is contemplated the palatal expansion device 100 including the mechanical turn counter 106 and/or the direction limiter 108 may assist the patient in following the prescribed treatment schedule.

The mechanical turn counter 106 and/or the direction limiter 108 may be housed in the body member 104 (e.g., the body member 104a and/or the body member 104b). Being housed by the body member 104 may refer to a portion of the mechanical turn counter 106 and/or the direction limiter 108 being coupled to a socket or a hole of the body member 104. For example, the mechanical turn counter 106 and/or the direction limiter 108 may be housed by the body member 104 in such a position so as to couple to the external threaded portion 118 (e.g., external threaded portion 118a, external threaded portion 118b). As depicted, the mechanical turn counter 106 may be housed in the body member 104a and coupled to the external threaded portion 118a and the direction limiter 108 may be housed in the body member 104b and coupled to external threaded portion 118b, although this is not intended to be limiting. It is further contemplated that the mechanical turn counter 106 and the direction limiter 108 may each be housed in a common body member and coupled to a common external threaded portion, although this is not depicted.

Figure 1B:
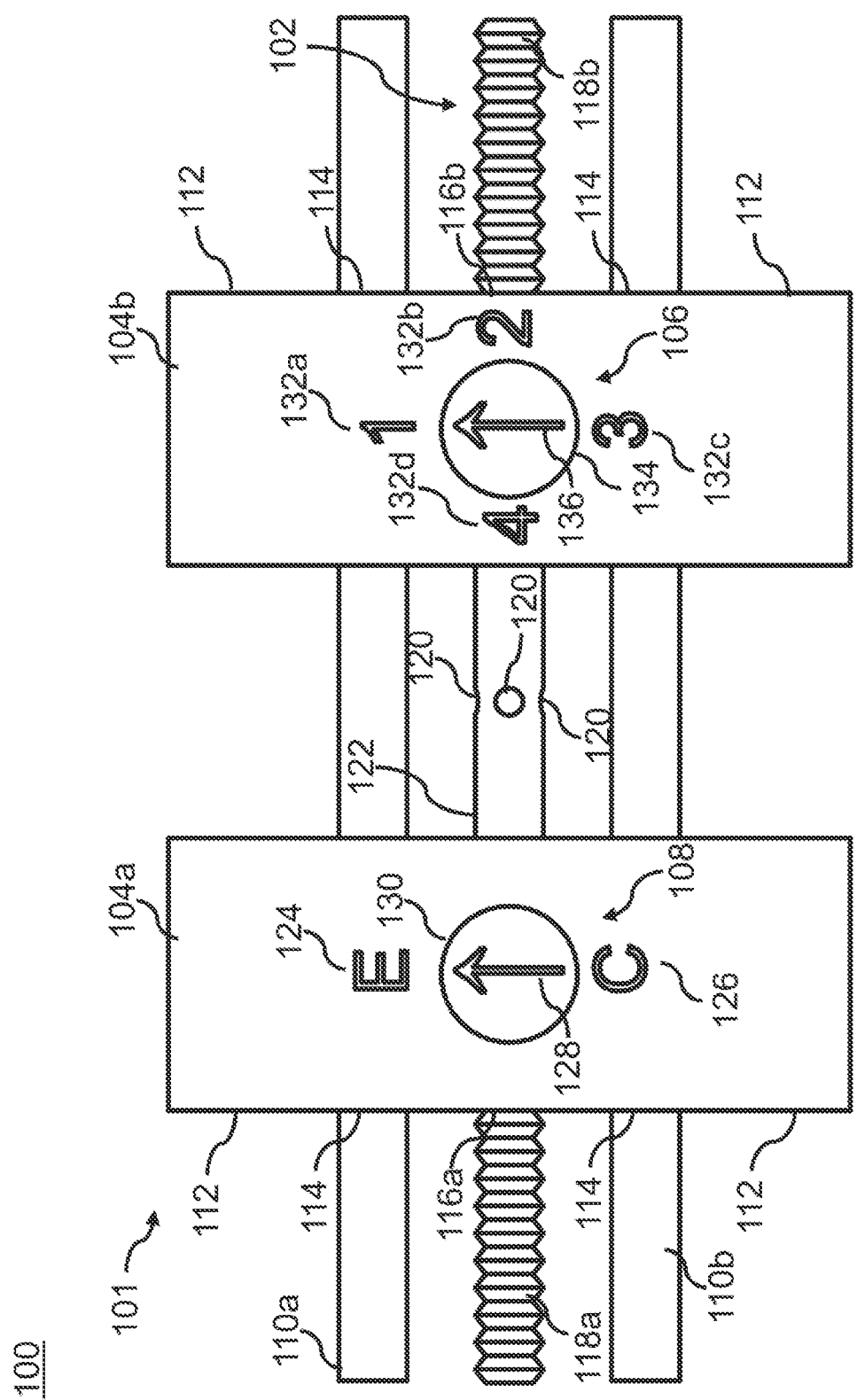
FIG. 1B illustrates a top view of a palatal expansion device including an expansion unit with a mechanical turn counter and a direction limiter, in accordance with one or more embodiments of the present disclosure.

As depicted in FIGS. 1A-1B, the palatal expansion device 100 is in a compressed position. The body members 104 are fully compressed in the compression position. The set number of turns of the mechanical turn counter 106 is one click. The mechanical turn counter 106 is set to one click by the dial 134 pointing to the turn setting 132a. Setting the mechanical turn counter to one click disengages the mechanical turn counter 106 and prevents expansion of the palatal expansion device 100. The direction limiter 108 is set to the expansion setting 124. The expansion setting 124 prevents compression of the jackscrew 102. Thus, the jackscrew 102 is locked by the mechanical turn counter 106 preventing expansion and the direction limiter 108 preventing compression.

Figure 1C:
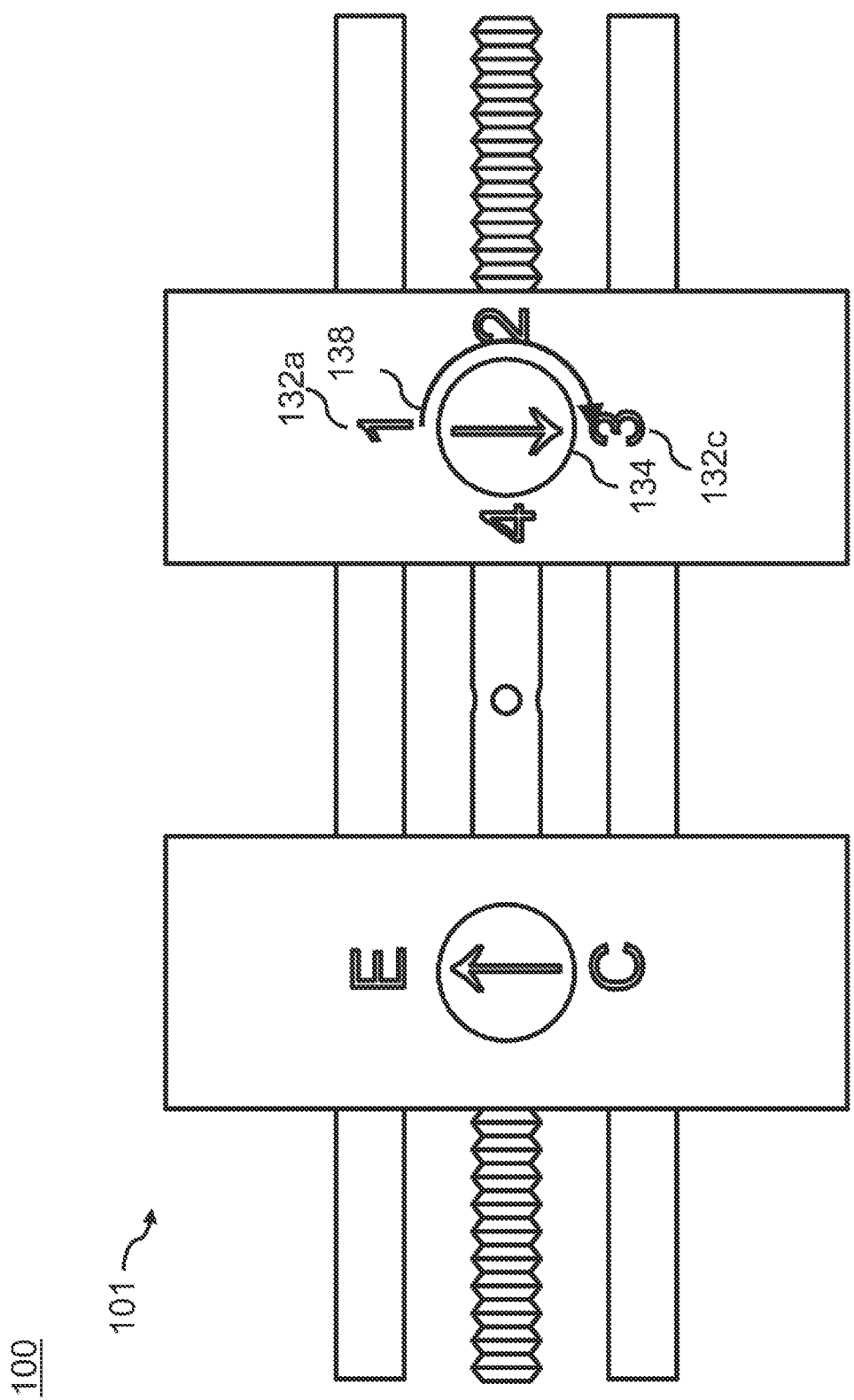
FIG. 1C illustrates a top view of a palatal expansion device including an expansion unit with a mechanical turn counter set to a preset number of turns, in accordance with one or more embodiments of the present disclosure.

As depicted in FIG. 1C, the set number of turns of the mechanical turn counter 106 is set to three clicks. The mechanical turn counter 106 is set to three clicks by the dial 134 pointing to the turn setting 132c. For example, the dial 134 may be rotated 138 from the turn setting 132a to the turn setting 132c. Thus, the jackscrew 102 is allowed to expand by the mechanical turn counter 106. The jackscrew 102 is prevented from compressing by the direction limiter 108.

Figure 1D:
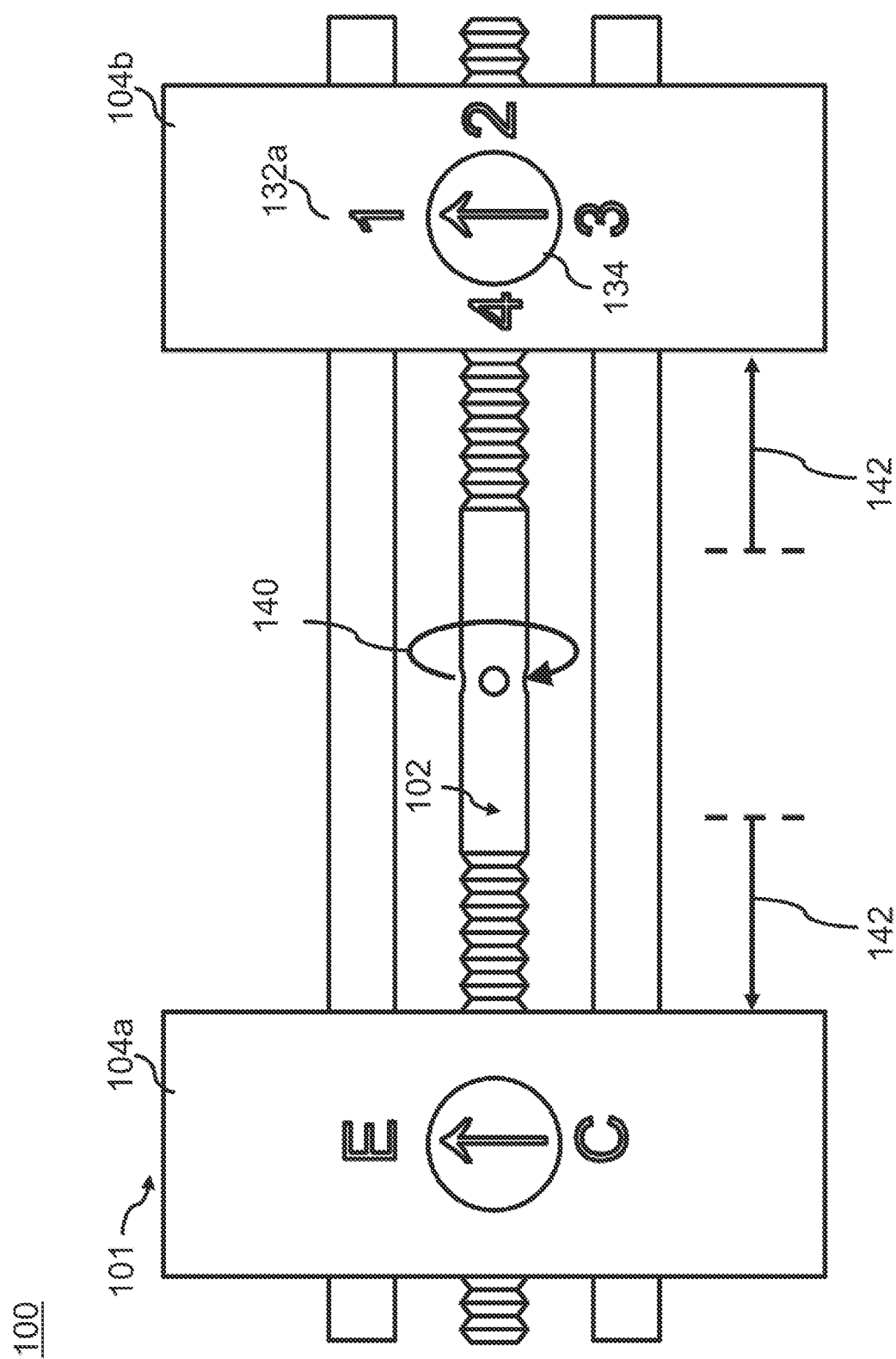
FIGS. 1D-1E illustrates a top view of a palatal expansion device including an expansion unit with body members which are partially expanded, in accordance with one or more embodiments of the present disclosure.

As depicted in FIG. 1D, the palatal expansion device 100 has been expanded from the compressed position. The expansion of the palatal expansion device 100 is based on the position of the body members 104. In particular, the body members 104 have translated 142 by a given distance. The mechanical turn counter 106 is set to one click by the dial 134 pointing to the turn setting 132a. The position of the dial 134 indicates that the jackscrew 102 has been rotated 140 by two clicks worth of turns. The dial 134 has automatically rotated from the turn setting 132c to the turn setting 132a following the rotation 140. For example, the jackscrew 102 may be rotated 140 by twenty-four turns where one click equates to twelve turns, although this is not intended to be limiting. The jackscrew 102 is locked by the mechanical turn counter 106 prevent expansion and the direction limiter 108 preventing compression.

Figure 1E:
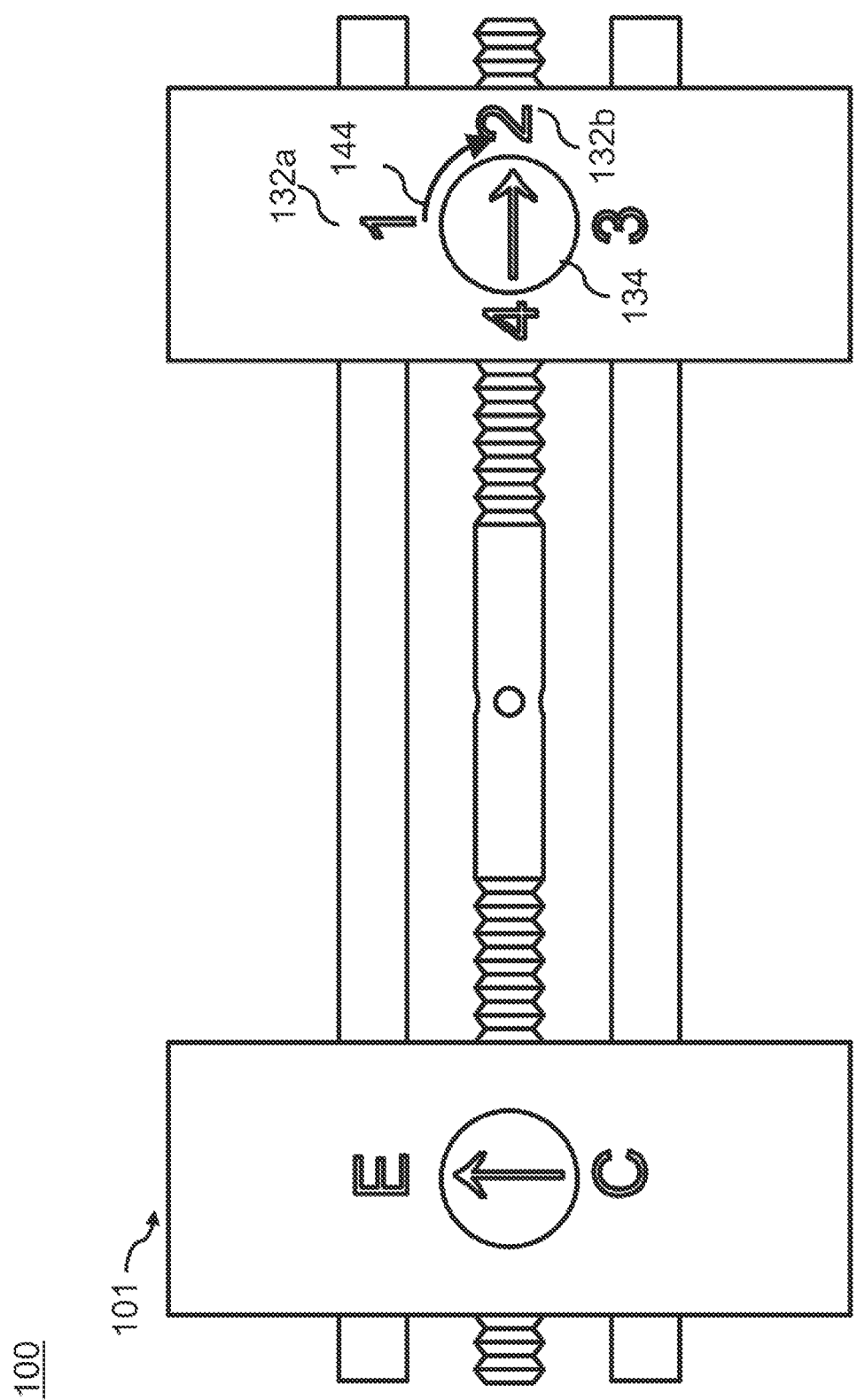

As depicted in FIG. 1E, the set number of turns of the mechanical turn counter 106 is two clicks. The mechanical turn counter 106 is set to two clicks by the dial 134 pointing to the turn setting 132b. For example, the dial 134 may be rotated 144 from the turn setting 132a to the turn setting 132b. Thus, the jackscrew 102 is allowed to expand by the mechanical turn counter 106 and is prevented from compressing by the direction limiter 108.

Figure 1F:
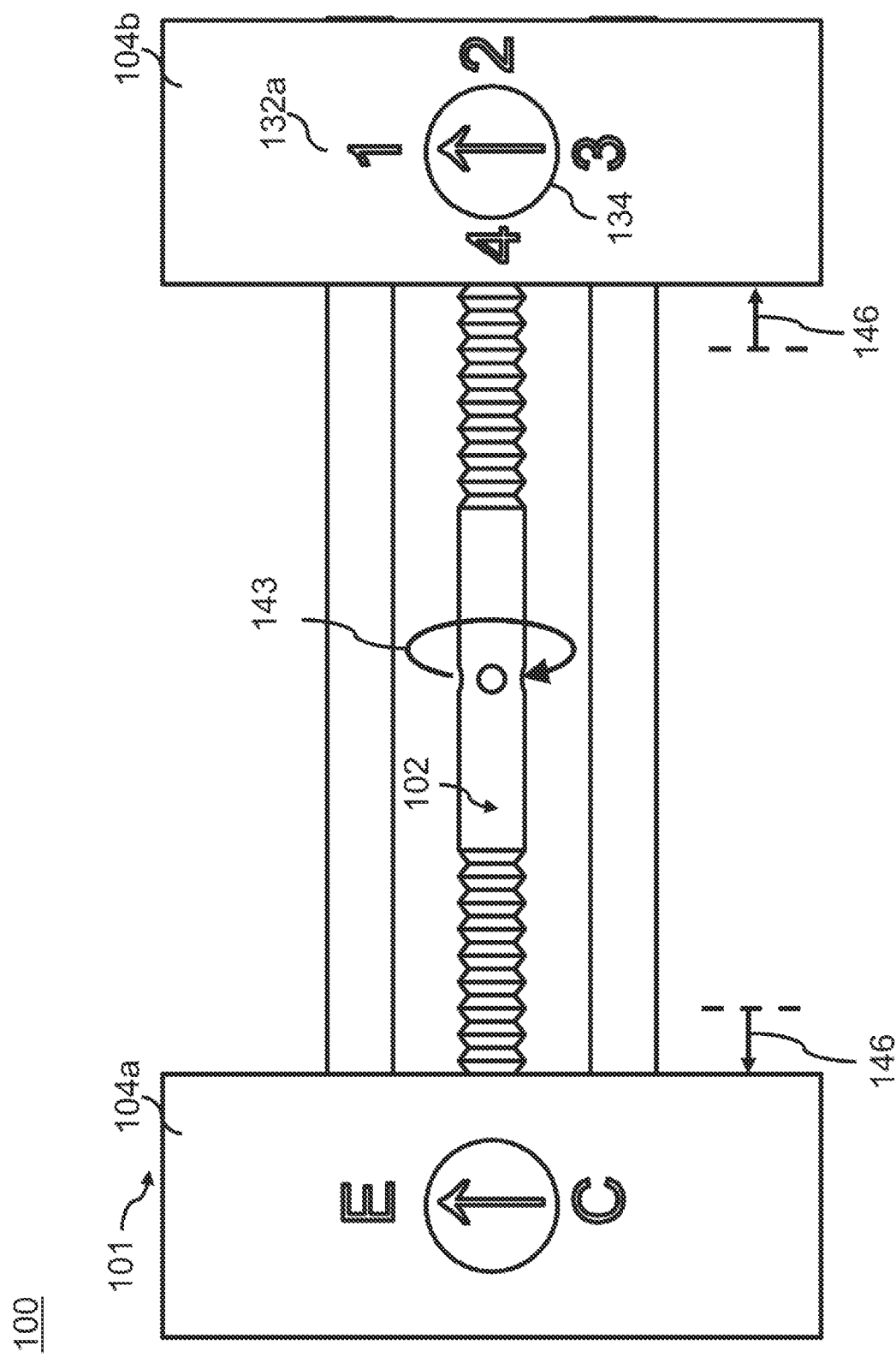
FIG. 1F illustrates a top view of a palatal expansion device including an expansion unit with body members which are fully expanded, in accordance with one or more embodiments of the present disclosure.
Figure 1G:
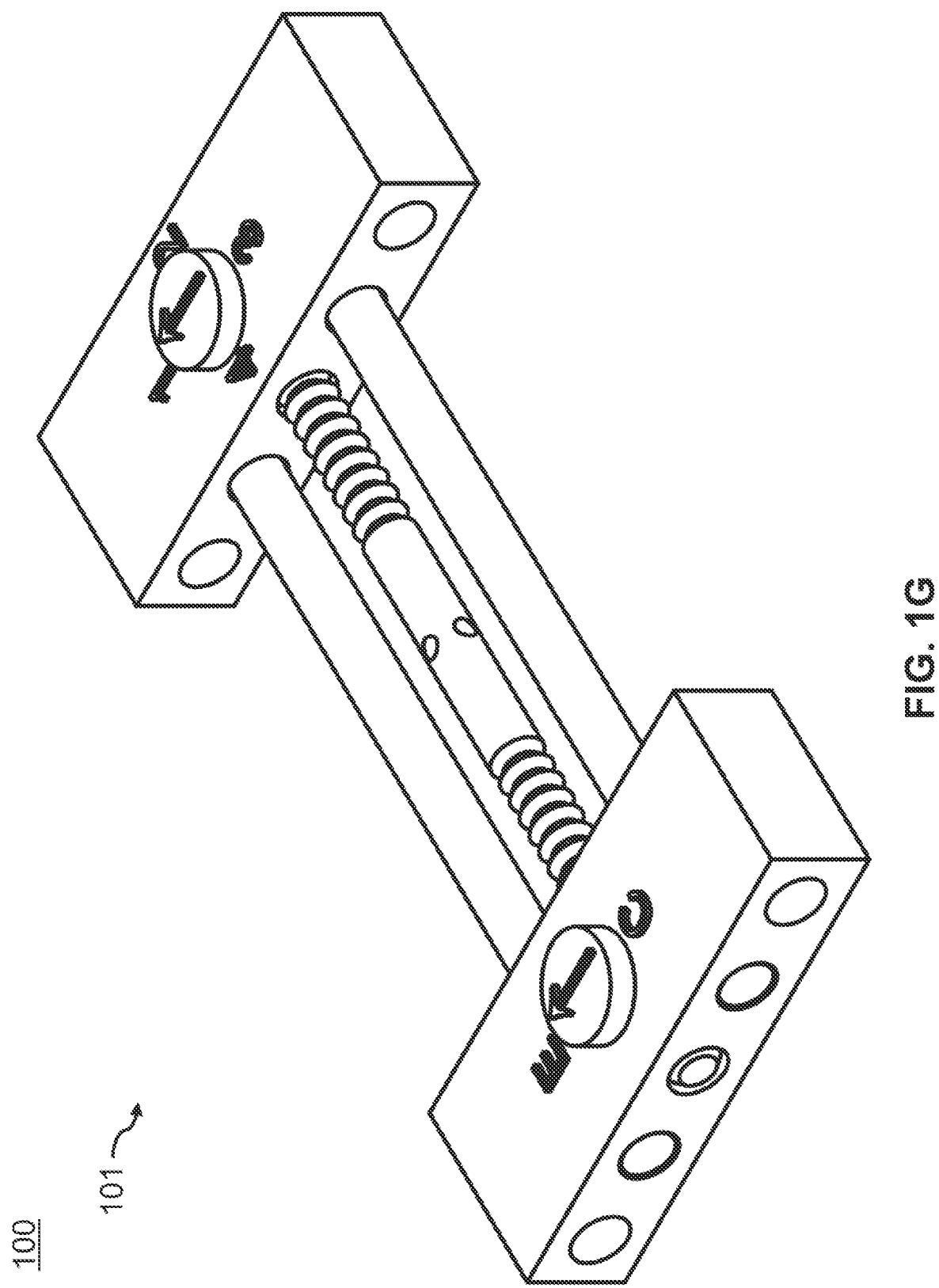
FIG. 1G illustrates a perspective view of a palatal expansion device including an expansion unit with body members which are fully expanded, in accordance with one or more embodiments of the present disclosure.

As depicted in FIGS. 1F-1G, the palatal expansion device 100 has been fully expanded. The body members 104 have translated 146 to the fully expanded position. The mechanical turn counter 106 is one click by the dial 134 pointing to the turn setting 132a, indicating the body members 104 have expanded by one click (e.g., twelve turns). The dial 134 has automatically rotated from the turn setting 132b to the turn setting 132a following the rotation 143. The jackscrew 102 is locked by the mechanical turn counter 106 preventing expansion and the direction limiter 108 preventing compression.

Figure 1H:
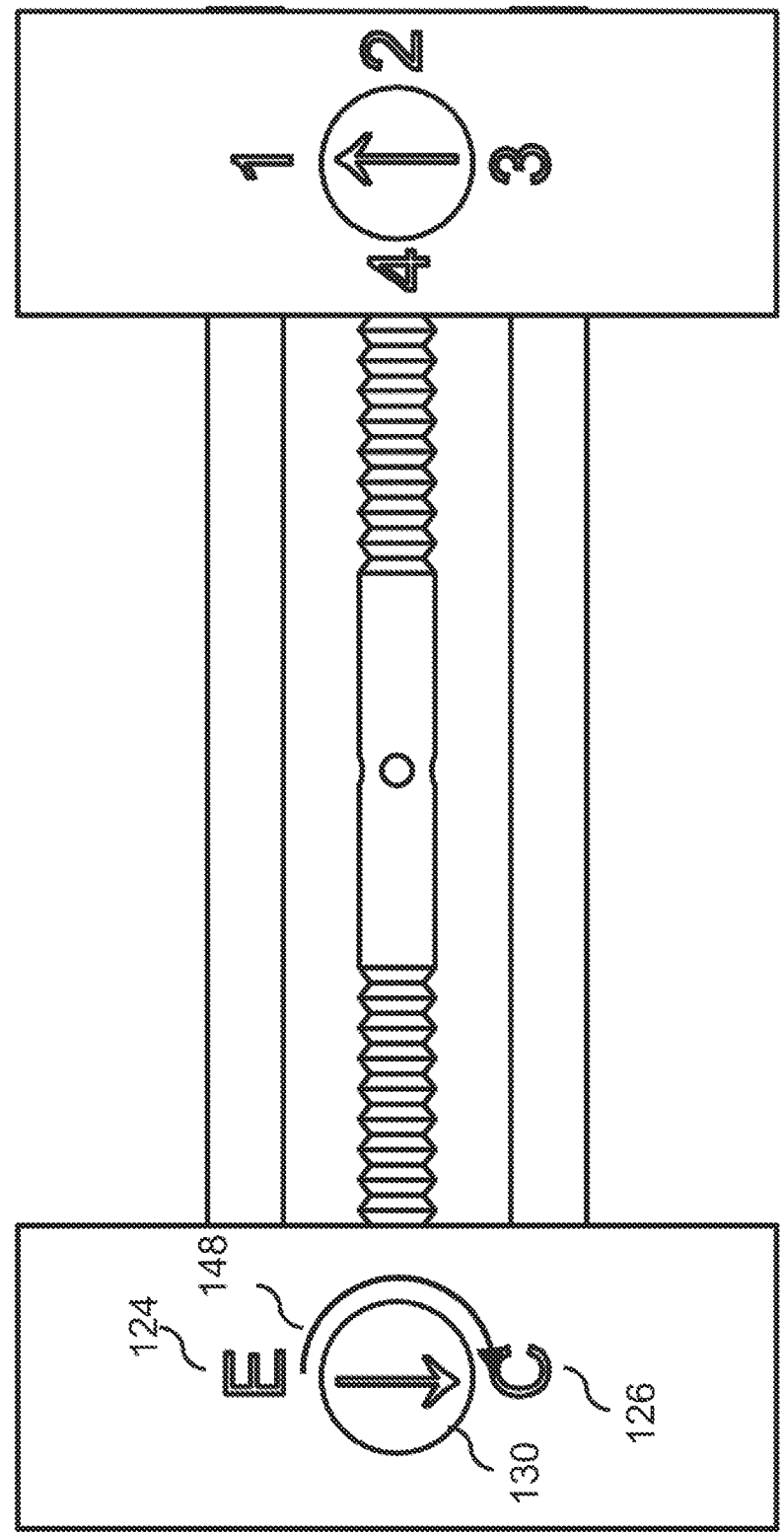
FIG. 1H illustrates a top view of a palatal expansion device including an expansion unit with a direction limiter in a compression setting, in accordance with one or more embodiments of the present disclosure.
Figure 11:
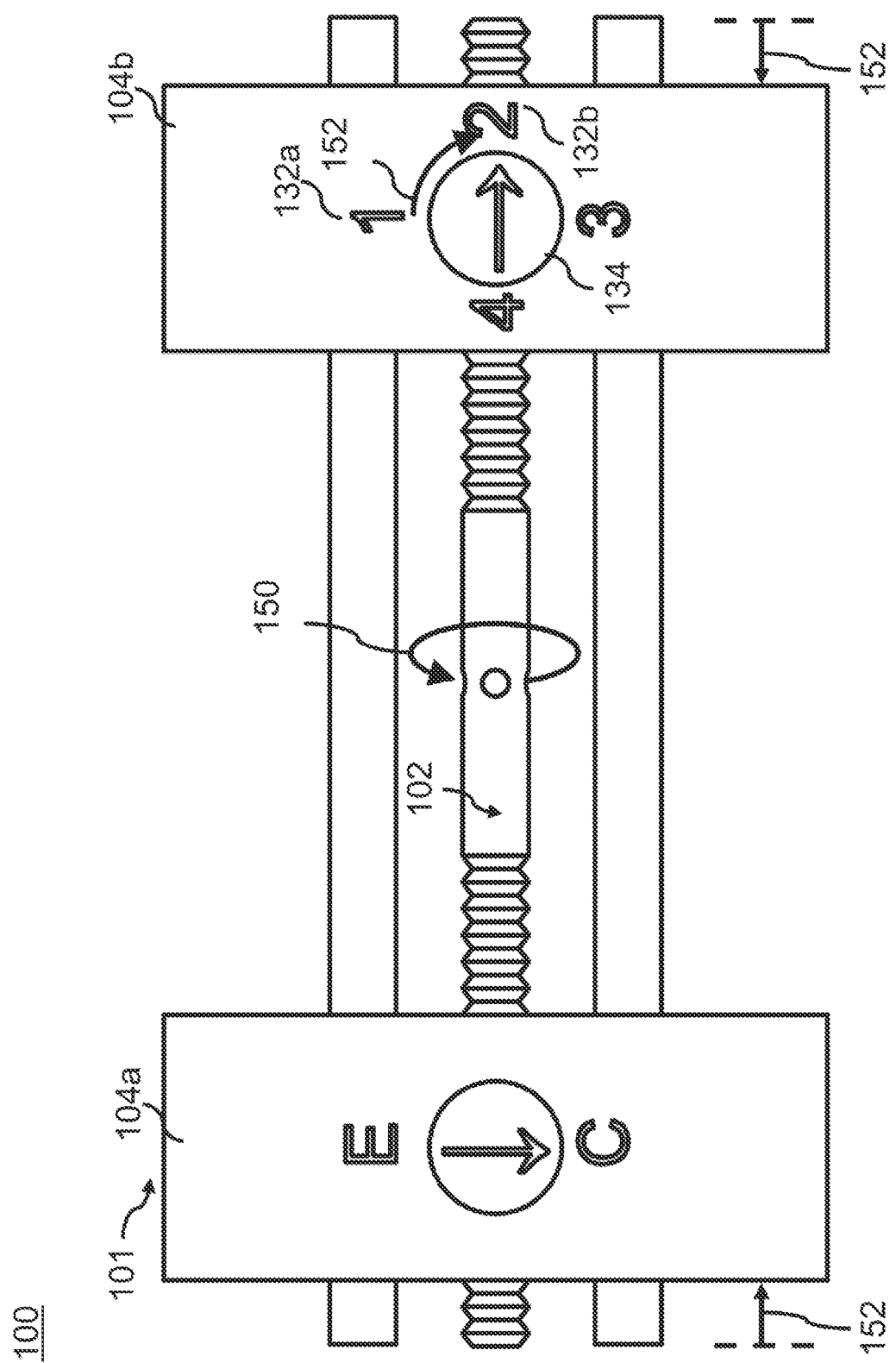

As depicted in FIG. 1H, the direction limiter 108 is set to compress. The direction limiter is set to compress by rotating 148 the direction indicator 128 to the compression setting 126. The jackscrew 102 is prevented from expanding by the mechanical turn counter 106 and/or the direction limiter 108. The jackscrew is allowed to compress by the direction limiter 108.

As depicted in FIG. 1I, the palatal expansion device 100 has been partially compressed from the fully expanded position. The body members 104 have translated 152 to the partially compressed position. The mechanical turn counter 106 is set to two clicks by the dial 134 pointing to the turn setting 132b, indicating the body members 104 have compressed by one click (e.g., twelve turns). The dial 134 has automatically rotated from the turn setting 132a to the turn setting 132b following the rotation 150. The rotation 150 is in the opposite direction to the rotation 140 and the rotation 143.

Figure 2A:
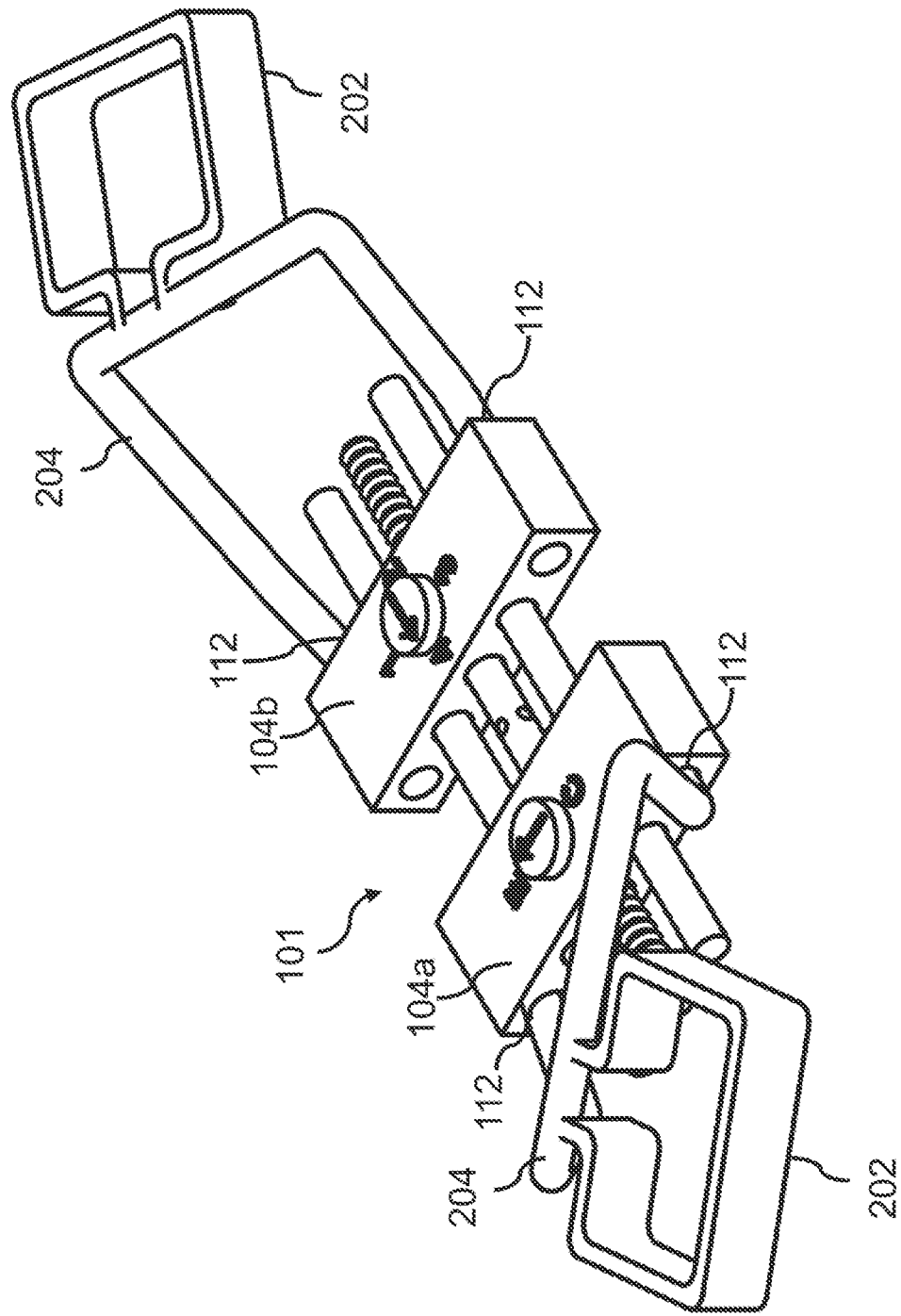
FIG. 2A illustrates a perspective view of a palatal expansion device including an expansion unit and orthodontic bands, in accordance with one or more embodiments of the present disclosure.
Figure 2B:
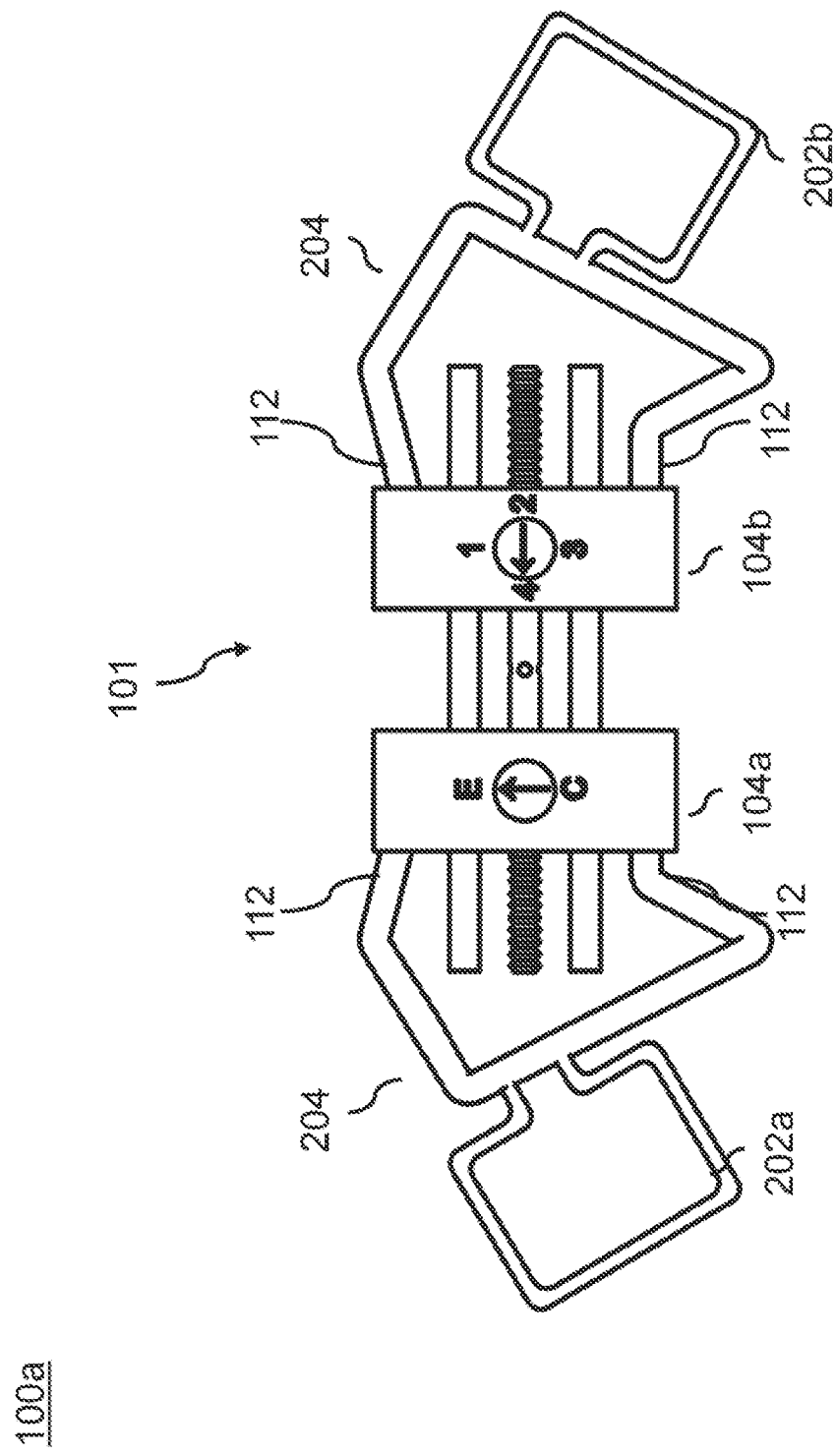
FIG. 2B illustrates a top view of a palatal expansion device including an expansion unit and orthodontic bands, in accordance with one or more embodiments of the present disclosure.
Figure 2C:
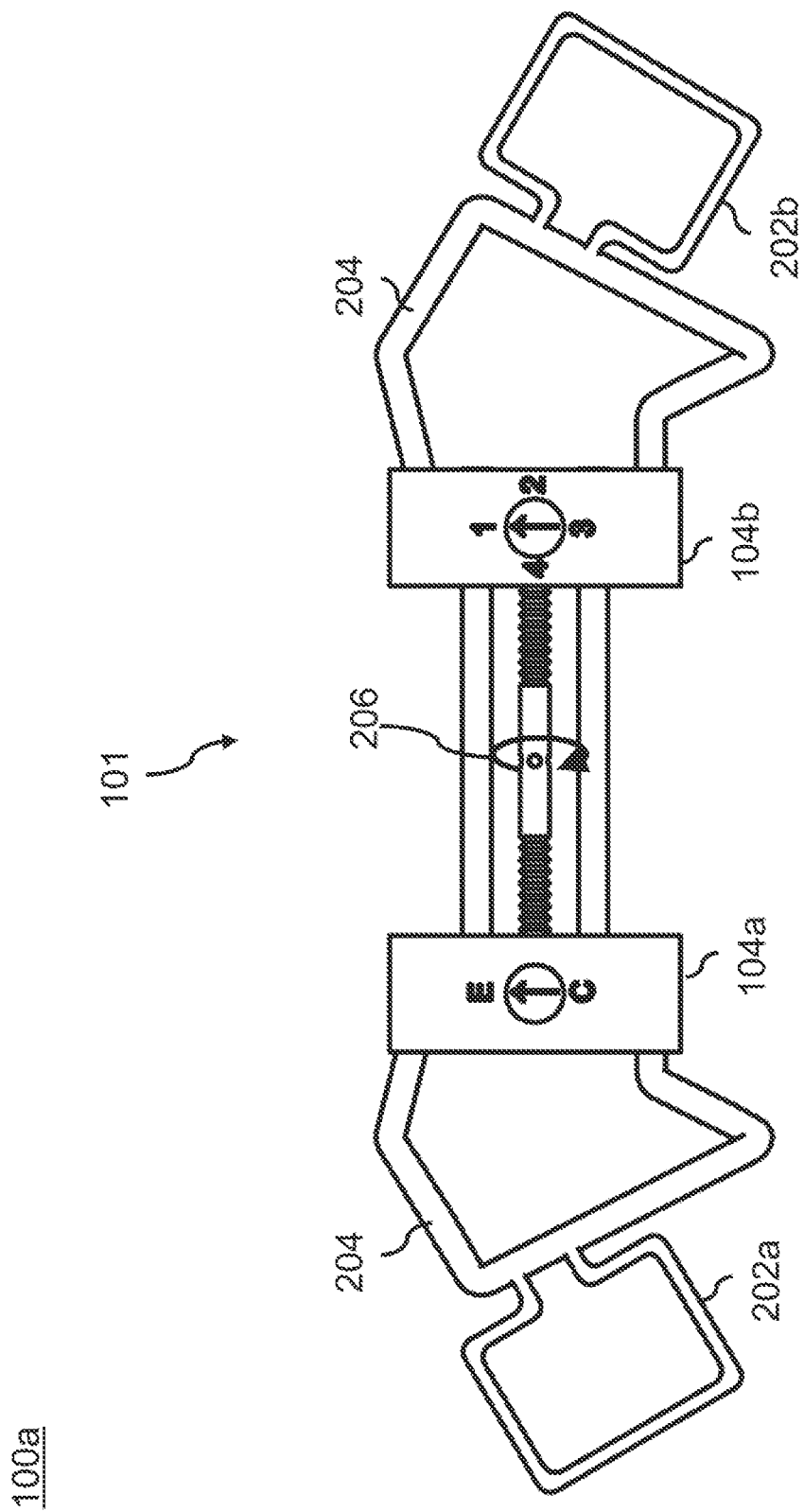
FIG. 2C illustrates a top view of a palatal expansion device including an expansion unit and orthodontic bands in an expanded position, in accordance with one or more embodiments of the present disclosure.

Referring now to FIGS. 2A-2C, a palatal expansion device 100a is described, in accordance with one or more embodiments of the present disclosure. The palatal expansion device 100a may be referred to as a tooth-borne expander, a removable Palatal Expander, a non-surgically inserted expander, and the like. The palatal expansion device 100a may allow expansion of the palate without surgical implants. The palatal expansion device 100a may be an example of the palatal expansion device 100 which includes orthodontic bands 202.

The expansion unit 101 may be coupled to the orthodontic bands 202. The palatal expansion device 100 may include one or more wires 204. The wires 204 may couple the expansion unit 101 to the orthodontic bands 202. Ends of the wires 204 may be coupled to the cylindrical bores 112 of the body members 104. As depicted, the body member 104a is coupled to the orthodontic band 202a and the body member 104b is coupled to the orthodontic band 202b by the wires 204. The orthodontic bands 202 may then be coupled to the wires 204 between the ends. In some instances, an orthodontist or a technician employed by the orthodontist may couple the wires 204 to the cylindrical bores 112 and/or the orthodontic bands 202 to the wires 204. The position of the orthodontic bands 202 and the wires 204 may be customized based on the locations of the teeth of the patient. The orthodontic bands 202 and the wires 204 may be bent into a customized shape on a patient-by-patient basis, such that the depiction of the palatal expansion device 100a is not intended to be limiting.

The orthodontic bands 202 may be dimensioned to couple to one or more teeth of the patient. The orthodontic bands 202 may include a generally ring-shaped structure by which the orthodontic bands 202 are configured to fit over one or more teeth a patient. The orthodontic bands 202 may be dimensioned to fit over primary teeth or baby teeth of the patient. The orthodontic bands 202 may be configured to fit over a number of type of teeth. For example, the orthodontic bands 202 may be configured to fit over one or more of the premolars (also referred to as bicuspids or first molars), the molars (also referred to as second molars), wisdom teeth (also referred to as third molars), canines (also referred to as the cuspid), the lateral incisors, or the central incisors. The orthodontic bands 202 may be sized to fit over the teeth of the upper jaw. Such orthodontic bands 202 may be applied to the teeth and secured by a physical coupling (e.g., clamping the orthodontic bands 202 to the teeth) or by a bonding agent (e.g., dental cement). Thus, the palatal expansion device 100a may be couplable to the palate, upper jaw, and/or maxilla by way of the teeth of the upper jaw.

The expansion unit 101 may be configured to expand the body members 104. The expansion of the body members 104 may cause the orthodontic band 202a to expand relative to the orthodontic band 202b. The expansion between the orthodontic bands 202 may provide force on the teeth which are coupled to the orthodontic bands 202. The force on the teeth may then cause an expansion of the palate, upper jaw, and/or maxilla over time.

As depicted in FIGS. 2A-2B, the palatal expansion device 100a may be in a fully compressed position. As depicted in FIGS. 2C, the palatal expansion device 100a may be in a fully expanded position following rotation 206 of the jackscrew 102.

Referring generally again to FIGS. 1A-2C. The palatal expansion device 100 may also be referred to as a rapid palatal expansion (RPE), depending upon the rate at which the palatal expansion device is operably engaged each day. RPEs can widen the upper jaw at a rate of 0.5 mm per day. Slow palate expansion can also be achieved by widening the upper jaw at a rate of 0.2 mm per week.

Although the palatal expansion device 100 is described as including the orthodontic bands 202, this is not intended as a limitation of the present disclosure. It is further contemplated that the palatal expansion device 100 may apply to a number of types of palatal expanders, such as, but not limited to, removable palatal expanders, implant-supported expanders, surgically-assisted expanders, bonded expanders, Haas expanders, Hyrax expanders, Bonded expanders, mini screw-assisted rapid palatal expander (MARPE), and the like. For example, mature adolescents may require implant-supported expanders. Implants may apply force directly to the maxillary bone, instead of indirectly to the maxillary bone by way of the teeth.

In embodiments, the palatal expansion device 100 may include a bonded expander (not depicted). The bonded expander may include one or more bite blocks (not depicted). The bite blocks may be molded over and bonded to one or more teeth of the patient. For example, a first bite block may be molded over and bonded to a first set of teeth and coupled to the body member 104a. A second bite block may be molded over and bonded to a second set of teeth and coupled to the second body member 104b. The translation of the body member 104a relative to the body member 104b may then cause the first bite block to expand relative to the second bite block for translating the first set of teeth relative to the second set of teeth. The translation of the first set of teeth relative to the second set of teeth may expand the palate of the patient.

The mechanical turn counter 106 may include any suitable mechanism for the mechanical counting. Similarly, the direction limiter 108 may include any suitable mechanism for directional control. In embodiments, the mechanical turn counter 106 and/or the direction limiter 108 may include a ratchet assembly (not depicted). The ratchet assembly may perform the counting and/or the directional control. A length by which the ratchet assembly may be turned may correspond to the distance between the holes 120 in the jackscrew 102. In this regard, each turn of the screw may correspond to one turn of the ratchet assembly. The ratchet assembly may also include a bi-directional or two-way ratchet. The bi-directional ratchet may be configured between two settings (e.g., expansion or compression) for the direction control. The ratchet assembly may include, but is not limited to, a gear, a pawl (also referred to as a click), and a spring (also referred to as a click spring).

The teeth of the jackscrew 102 may mate with the gear of the ratchet assembly. The mating between the jackscrew 102 and the gear may be referred to as a worm drive mechanism. Rotation of the jackscrew 102 (e.g., by the key-wrench) may then cause the gear to be similarly rotated. As may be understood, the gear of the ratchet assembly may include any suitable gear. It is contemplated that one or more specifications of the gear may be selected to provide a desired number of clicks per turn of the jackscrew 102. For example, the gear may include a diameter, a number of teeth, and a pitch which are selected to provide the desired number of clicks per turn.

The pawl of the ratchet assembly may engage with and follow the gear. The spring of the ratchet assembly may provide a motive force to the pawl, forcing the pawl against the gear of the ratchet assembly causing the pawl to follow the gear. The pawl may prevent a return rotation of the gear (and similarly a return rotation of the jackscrew 102). Preventing the rotation of the jackscrew 102 may thereby preventing compression or expansion, depending upon the operable configuration.

In embodiments, the pawl of the ratchet assembly may be configurable between one or more position. The positions of the pawl may correspond to the expansion setting 124 and the compression setting 126. For example, the dial 130 may control the position of the pawl. In this regard, the rotation of the dial 130 between the expansion setting 124 and the compression setting 126 may change the position of the pawl. In the expansion setting 12, the pawl may prevent rotation of the gear, and similarly the jackscrew 102, in a first direction (e.g., clockwise, anti-clockwise). In the compress setting 126, the pawl may prevent rotation of the gear, and similarly the jackscrew 102, in a direction opposite to the first direction.

The ratchet assembly may further include any number gears in a gear train for torque conversion (e.g., reduction or expansion), among other purposes. Such gears may include, but are not limited to, helical, spur, or bevel gears.

Although the mechanical turn counter 106 and/or the direction limiter 108 have been described as including a ratchet assembly (not depicted) for counting and directional control, this is not intended as a limitation on the present disclosure. It is contemplated that the mechanical turn counter 106 and/or the direction limiter 108 may include an intermittent mechanism, such as, but not limited to, a Geneva drive, and the like for counting and directional control.

Although the expansion unit 101 has been described as counting the number of turns by the mechanical turn counter 106, this is not intended as a limitation of the present disclosure. It is contemplated that the expansion unit 101 may include a number of possible mechanisms for counting the number of turns. Furthermore, the expansion unit 101 may count the amount of expansion or compression. In embodiments, the expansion unit 101 may include a line gauge (not depicted), ruler, or the like. The line gauge may be may be built into the stabilizing rod 110. As the stabilizing rod 110 is expanded relative to the body member 104, the line gauge may indicate the amount of travel. Thus, the line gauge may measure the amount of expansion such that the rotary type mechanism may not be needed. For example, the user may be expecting to operate the expansion unit 101 to expand the jaw by 0.5 mm which corresponds to a given number of turns. The user may engage the jackscrew 102 for the given number of turns. The user may then compare the starting position of the line gauge with the ending position to determine if the appropriate amount of expansion has occurred. Similarly, the orthodontist may view the position of the line gauge during check-ups. The line gauge may be beneficial in providing a visual reference indicative of the direction in which the palatal expansion device 100 is expanding or contracting. For example, the user may be expecting to operate the palatal expansion device 100 to expand the jaw by 0.5 mm. The user may incorrectly engage the jackscrew 102, such that the orthodontic bands 202 compress towards each other. The user may then visually check the line gauge position against the expected position and determine the palatal expansion device 100 was compressed instead of expanded. The user may then remediate the error by expanding the jackscrew 102 an appropriate number of turns.

One skilled in the art will recognize that the herein described components operations, devices, objects, and the discussion accompanying them are used as examples for the sake of conceptual clarity and that various configuration modifications are contemplated. Consequently, as used herein, the specific exemplars set forth and the accompanying discussion are intended to be representative of their more general classes. In general, use of any specific exemplar is intended to be representative of its class, and the non-inclusion of specific components, operations, devices, and objects should not be taken as limiting.

As used herein, directional terms such as "top," "bottom," "over," "under," "upper," "upward," "lower," "down," and "downward" are intended to provide relative positions for purposes of description, and are not intended to designate an absolute frame of reference. Various modifications to the described embodiments will be apparent to those with skill in the art, and the general principles defined herein may be applied to other embodiments.

With respect to the use of substantially any plural and/or singular terms herein, those having skill in the art can translate from the plural to the singular and/or from the singular to the plural as is appropriate to the context and/or application. The various singular/plural permutations are not expressly set forth herein for sake of clarity.

The herein described subject matter sometimes illustrates different components contained within, or connected with, other components. It is to be understood that such depicted architectures are merely exemplary, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "connected," or "coupled," to each other to achieve the desired functionality, and any two components capable of being so associated can also be viewed as being "couplable," to each other to achieve the desired functionality. Specific examples of couplable include but are not limited to physically mateable and/or physically interacting components and/or wirelessly interactable and/or wirelessly interacting components and/or logically interacting and/or logically interactable components.

Furthermore, it is to be understood that the invention is defined by the appended claims. It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," and the like). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to inventions containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations). Furthermore, in those instances where a convention analogous to "at least one of A, B, and C, and the like" is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, and the like). In those instances where a convention analogous to "at least one of A, B, or C, and the like" is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, and the like). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

It is believed that the present disclosure and many of its attendant advantages will be understood by the foregoing description, and it will be apparent that various changes may be made in the form, construction and arrangement of the components without departing from the disclosed subject matter or without sacrificing all of its material advantages. The form described is merely explanatory, and it is the intention of the following claims to encompass and include such changes. Furthermore, it is to be understood that the invention is defined by the appended claims.

What is claimed:

1. A palatal expansion device, comprising:
    an expansion unit comprising:
        a jackscrew comprising a first external threaded portion and a second external threaded portion, wherein the first external threaded portion includes a first handedness and the second external threaded portion includes a second handedness which is opposite to the first handedness, wherein the jackscrew defines a plurality of holes between the first external threaded portion and the second external threaded portion, wherein the plurality of holes are revolved around an axis of the jackscrew;

a first body member mated to the jackscrew;

a second body member mated to the jackscrew, wherein turning the jackscrew causes the first body member to translate relative to the second body member;

a mechanical turn counter, wherein the mechanical turn counter is one of housed by the first body member and coupled to the first external threaded portion or housed by the second body member and coupled to the second external threaded portion, wherein the mechanical turn counter is configured to count a number of turns of the jackscrew; and a direction limiter configured to prevent compression of the first body member relative to the second body member, wherein the direction limiter is one of housed by the first body member and coupled to the first external threaded portion or housed by the second body member and coupled to the second external threaded portion, wherein the direction limiter is configurable between an expansion setting and a compression setting, wherein the direction limiter is configured to permit expansion and prevent compression of the first body member relative to the second body member in the expansion setting, wherein the direction limiter is configured to prevent expansion and permit compression of the first body member relative to the second body member in the compression setting.

2. The palatal expansion device of claim 1, wherein the mechanical turn counter comprises a dial, wherein the dial visually indicates the number of turns.

3. The palatal expansion device of claim 2, wherein the mechanical turn counter is configured to prevent rotation of the jackscrew upon reaching a set number of turns of the jackscrew.

4. The palatal expansion device of claim 3, wherein the set number of turns is adjustable; wherein the dial is configured to rotate for adjusting the set number of turns.

5. The palatal expansion device of claim 1, wherein the plurality of holes are configured to receive a key-wrench, wherein the jackscrew is configured to turn by the key-wrench.

6. The palatal expansion device of claim 1, the expansion unit comprising at least one stabilizing rod, wherein each of the first body member and the second body member comprise a cylindrical bore, wherein the at least one stabilizing rod is disposed in the cylindrical bore, wherein the first body member and the second body member are configured to translate along the at least one stabilizing rod.

7. The palatal expansion device of claim 1, further comprising a first orthodontic band and a second orthodontic band; wherein the first orthodontic band is coupled to the first body member; wherein the second orthodontic band is coupled to the second body member; wherein translation of the first body member relative to the second body member causes the first orthodontic band to translate relative to the second orthodontic band.

8. The palatal expansion device of claim 1, wherein a number of turns-per-revolution of the jackscrew is based on the plurality of holes.

9. A palatal expansion device:
an expansion unit comprising:
a jackscrew comprising a first external threaded portion and a second external threaded portion, wherein the first external threaded portion includes a first handedness and the second external threaded portion includes a second handedness which is opposite to the first handedness, wherein the jackscrew defines a plurality of holes between the first external threaded portion and the second external threaded portion, wherein the plurality of holes are revolved around an axis of the jackscrew;

a first body member mated to the jackscrew;

a second body member mated to the jackscrew, wherein turning the jackscrew causes the first body member to translate relative to the second body member; and a direction limiter configured to prevent compression of the first body member relative to the second body member, wherein the direction limiter is one of housed by the first body member and coupled to the first external threaded portion or housed by the second body member and coupled to the second external threaded portion, wherein the direction limiter is configurable between an expansion setting and a compression setting, wherein the direction limiter is configured to permit expansion and prevent compression of the first body member relative to the second body member in the expansion setting, wherein the direction limiter is configured to prevent expansion and permit compression of the first body member relative to the second body member in the compression setting.

10. The palatal expansion device of claim 9, wherein the direction limiter comprises a dial, wherein the dial is configured to rotate between the expansion setting and the compression setting.

11. The palatal expansion device of claim 9, the expansion unit comprising a mechanical turn counter housed by one of the first body member or the second body member, wherein the mechanical turn counter is configured to count a number of turns of the jackscrew.

12. The palatal expansion device of claim 9, the expansion unit comprising at least one stabilizing rod, wherein each of the first body member and the second body member comprise a cylindrical bore, wherein the at least one stabilizing rod is disposed in the cylindrical bore, wherein the first body member and the second body member are configured to translate along the at least one stabilizing rod.

13. The palatal expansion device of claim 9, further comprising a first orthodontic band and a second orthodontic band; wherein the first orthodontic band is coupled to the first body member; wherein the second orthodontic band is coupled to the second body member; wherein translation of the first body member relative to the second body member causes the first orthodontic band to translate relative to the second orthodontic band.

14. The palatal expansion device of claim 9, wherein a number of turns-per-revolution of the jackscrew is based on the plurality of holes.

* * * * *